Patented Apr. 23, 1929.

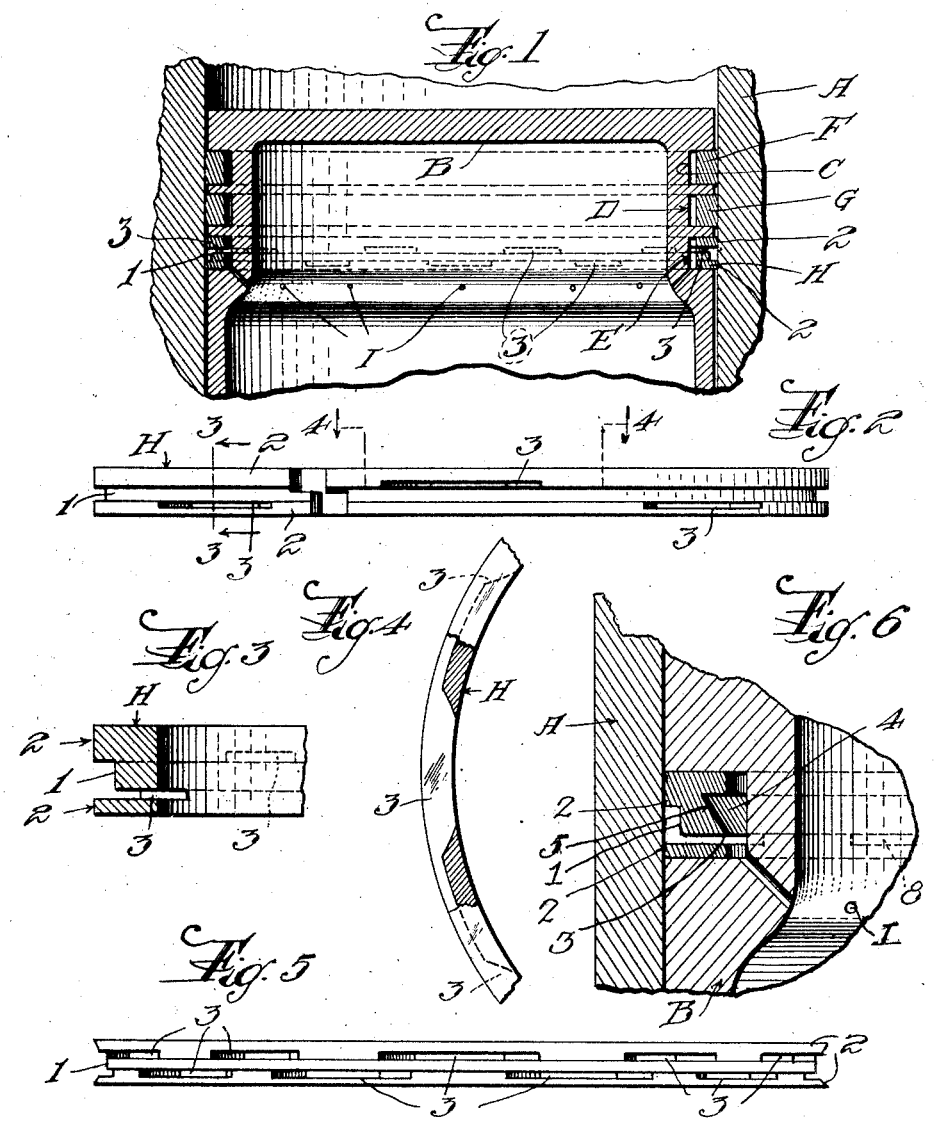

1,710,250

UNITED STATES PATENT OFFICE.

JACOB B. WENZEL, OF BLOOM, COLORADO, ASSIGNOR TO ALBERT W. WENZEL, OF NEWARK, NEW JERSEY.

PISTON RING.

Application filed September 19, 1925. Serial No. 57,259.

This invention relates particularly to piston rings of the type having annular grooves or channels in the outer circumferential surfaces thereof to receive oil from the cylinder walls so as to maintain a constant proper lubrication of the cylinder and prevent the accumulation of an excessive amount of oil on the walls of the cylinder. More particularly, the invention relates to a piston ring of this general character in which transverse passages are formed in the ring and communicate with the annular oil groove for conducting the oil through the ring into the piston ring groove and which cooperate with openings formed in the piston for conducting excess oil through the piston back to the crank case.

One object of the invention is to provide a piston ring of this character in which the transverse passages or slots in the ring are so related to the oil groove or channel as to permit the slots being of maximum oil carrying capacity with a minimum weakening of the ring both in area of its bearing surface on the cylinder wall and the resiliency of the ring.

Another object is to provide such a piston ring having an annular recess or groove on the inner periphery thereof communicating with said slots or transverse passages to provide a storage space or reservoir for excess oil so as to facilitate in the draining of the oil from the cylinder walls.

Further objects of the invention are to provide a piston ring of the oil draining type including an annular groove or channel in the outer periphery or bearing surface thereof and a plurality of circumferentially arranged transverse slots communicating with said groove and so arranged relatively thereto as to permit a maximum number of said slots without material weakening of the piston ring, and to obtain other results and advantages as may be brought out by the following description.

Referring to the accompanying drawing, in which the same reference characters designate corresponding and like parts throughout the several views, Figure 1 is a fragmentary transverse vertical sectional view through a cylinder and a piston having a piston ring embodying the invention applied thereto;

Figure 2 is an enlarged edge elevation of the piston ring;

Figure 3 is a fragmentary transverse vertical sectional view, taken on the line 3—3 of Figure 2;

Figure 4 is a horizontal sectional view, taken on the line 4—4 of Figure 2;

Figure 5 is an edge elevation of a piston ring showing a modified arrangement of the oil draining slots;

Figure 6 is a fragmentary transverse sectional view through a cylinder wall, piston and piston ring showing a modified form of the invention.

Specifically describing the embodiment of the invention shown in Figures 1–4 inclusive, the reference character A designates a cylinder within which is reciprocable a piston B having a plurality of piston ring grooves C, D and E to receive the piston rings F, G of known type, and a ring H constructed in accordance with the invention. The piston B is provided with a plurality of transverse oil drain passages I communicating with the piston ring groove E.

The piston ring embodying the invention is of the usual split type maintained in frictional engagement with the cylinder walls by its inherent resiliency. On its outer periphery or bearing face, the ring is provided with an annular groove or channel 1 with an annular bearing surface 2 arranged at each side thereof for engagement with the cylinder walls. A plurality of transverse slots 3 are formed in the ring, alternate slots 3 being disposed at opposite sides of the groove 1 and communicating with said groove. With such an arrangement of the slots, it will be noted that they are out of alinement with each other and thereby weaken the ring to a less extent than were they arranged in substantially circumferential alinement. Furthermore, such an arrangement of the slots will permit of the groove 1 being of less width than would be possible were the slots arranged within the groove, since the area of the slots outside of the groove produces the same effect as the groove itself. It will thus be observed that the slots 3 may be arranged closely adjacent each other, and where desirable overlap each other, as shown in Figure 5, so that a maximum number of slots may be provided in the ring with a minimum weakening of the ring both in the area of its bearing surface and the resiliency of the ring. Accordingly, a maximum draining capacity is obtained.

In operation, the edges of the groove 1 and the outer edges of the slots 3 scrape some of the oil from the cylinder walls and into the groove. Should an excessive amount of oil be removed from the cylinder walls, it will be conducted by the slots 3 into the piston ring groove E and from there through the drain passages I to the crank case. At the same time, the groove 1 serves to distribute a certain amount of oil upon the cylinder walls so as to maintain the latter properly lubricated.

In some motors, such an excessive amount of oil accumulates on the cylinder walls as cannot be drained off sufficiently fast by the openings I in the piston on the downward stroke of the piston, and in such cases I may provide an oil storage groove or reservoir 4 on the inner periphery of the ring, as shown in Figure 6, said groove preferably having a wall 5 inclined inwardly from the lower side of the ring for directing oil by action of gravity to the bottom of the piston ring groove. In operation, the oil runs through the transverse slots in the ring as above described, and collects in the groove 4 from where it is drained off through the openings I in the piston. Obviously, the groove 4 will accommodate a large amount of excess oil such as might be splashed upon the cylinder walls at various times, thereby ensuring a uniform film of oil on the cylinder walls even under such conditions; and should all the excess oil fail to drain through the openings I on the downward stroke of the piston the groove 4 will accommodate the remainder of the excess oil during the next upward stroke of the piston. Without the groove 4, it will be obvious that should an abnormal excess of oil pass through the slot 3, it would be restricted in the piston ring groove and consequently not drain off fast enough to prevent it from leaking around the piston ring and back onto the cylinder walls.

The bearing surface of the ring shown in Figures 1-4 inclusive also might be concave, as shown in Figure 5, to expedite "wearing in" to proper engagement with the cylinder walls, and the groove 1 will effectively lubricate the sharp edges of the ring during the "wearing in" action.

While I have shown and described piston rings embodying certain details of construction, it will be understood that this is primarily for the purpose of illustrating the principles of the invention, and that many modifications and changes may be made in the shapes of the grooves and slots and the relation thereof to each other, without departing from the spirit or scope of the invention. Therefore, I do not desire to be understood as limiting myself except as required by the following claim when construed in the light of the prior art.

Having thus described the invention, what I claim is:

The combination of a hollow piston having a piston ring groove and openings leading from said groove into the interior of said piston, of a piston ring having a circumferential groove in its outer peripheral surface, and a plurality of elongated circumferential transverse slots in the ring opening through said peripheral surface and alternately disposed in opposite sides of said groove parallel therewith and each opening into said groove throughout the length of one side of the slot.

JACOB B. WENZEL.